Patented Mar. 7, 1939

2,149,309

UNITED STATES PATENT OFFICE 2,149,309

ALKALI CELLULOSE

Floyd C. Peterson and Albert T. Maasberg, Midland Mich., assignors to The Dow Chemical Company, Midland, Mich., a corporation of Michigan No Drawing. Application June 30, 1937, Serial No. 151,156

5 Claims. (Cl. 260—10)

This invention relates to the preparation of alkali cellulose and especially to an alkali cellulose from which a low viscosity cellulose ether may be prepared.

In the preparation of highly etherified cellulose by the interaction of alkali cellulose and etherifying agents such as ethyl chloride or benzyl chloride, the viscosity of the cellulose ether varies directly with the viscosity of the cellulose from which such ether is prepared. More particularly, the viscosity of a highly etherified cellulose varies directly as the viscosity of the cellulose in the alkali cellulose from which the ether is prepared.

The cellulose ethers most valuable to the coating composition and related arts are those which dissolve readily in various common solvents. More specifically, such ethers contain from about 2.0 to about 2.75 etherifying substituent groups per anhydro-glucose unit. For many purposes the preferred cellulose ether is one having a low intrinsic viscosity. This is especially true in the case of lacquers and similar solutions of cellulose derivatives which owe most of their viscosity to the cellulose derivative present. In such compositions, the lower intrinsic viscosity of the cellulose derivative employed, the greater is the amount of such derivative which can be dissolved to form a solution whose viscosity is in a particular range.

Cellulose ethers having the aforesaid number of substituent groups may be prepared from alkali celluloses of widely varying alkali:cellulose and water:cellulose ratios. The most economical alkali cellulose is one having an alkali:cellulose ratio from about 1:1 to about 4:1 and a water:cellulose ratio varying between about 0.3:1 and 2.0:1. The production of low viscosity cellulose ethers from such an alkali cellulose has ordinarily been accomplished by etherifying the alkali cellulose regardless of its viscosity and thereafter reducing the viscosity of the cellulose ether to the desired extent, suitably by treatment thereof with acids or other compounds capable of producing the same result. This procedure is objectionable as it results in the formation of cellulose ethers which will yield films and filaments which are too brittle and too unstable for present day commercial applications.

It is among the objects of this invention to provide a process for the preparation of an alkali cellulose from which cellulose ethers of low viscosity may be produced. Another object is to provide a process for the preparation of low viscosity alkali cellulose adapted to be employed in etherification reactions, and from which cellulose ethers may be formed having greater tensile strength and elongation than is obtained by etherifying such low viscosity alkali cellulose prepared by previously known methods. A further object is to provide a process whereby a low viscosity alkali cellulose may readily be prepared. Our invention then is concerned with a process whereby the viscosity of the cellulose in an alkali cellulose may be reduced, without material impairment of such physical properties as tensile strength and elongation of ether films and filaments producible therefrom.

We have now discovered that the viscosity of alkali cellulose of the above-defined alkali and water:cellulose ratios may be reduced without detrimentally affecting the tensile strength and elongation of ether films producible therefrom, by aging the alkali cellulose at temperatures varying from about 5 centigrade degrees below the hardening point thereof to the temperature at which injurious degradation occurs, i. e. to above about 130° C. This temperature varies somewhat according to the alkali cellulose composition and other factors, and may in some instances be as low as 140° C. although it is frequently above about 170° C. For ease of control we ordinarily age at temperatures between the hardening point and about 100° C.

We define the hardening point of alkali cellulose as the temperature at which the slope of a cooling curve, wherein the temperature of a warm alkali cellulose aggregate is plotted against cooling time, changes materially, and becomes more nearly parallel with the time axis. This corresponds to the temperature at which alkali dust becomes noticeable when an alkali cellulose is being cooled and shredded. The hardening point of an alkali cellulose containing alkali and water in ratios corresponding to an alkali solution of from 60 to 80 per cent concentration, is approximately 15 to 18 centigrade degrees lower than the freezing point of an alkali solution of the aforesaid 60 to 80 per cent concentration. For example, an alkali cellulose containing alkali and water in ratios corresponding to a 65 per cent solution of sodium hydroxide in water has a hardening point of about 47° C. whereas the freezing point of a 65 per cent aqueous solution of sodium hydroxide is about 63° C. Similarly, the hardening point of an alkali cellulose, wherein the alkali and water content corresponds to an alkali solution of about 75 per cent, has a hardening point of approximately 56 C., while the freezing point of 75 per cent aqueous sodium hydroxide solution is about 72° C.

Our process is applicable to the treatment of an alkali cellulose which has been produced by grinding or shredding cellulose, sodium hydroxide, and water according to well known methods. The alkali cellulose which we prefer to employ, however, is one prepared according to the method described and claimed by Collings et al in U. S. patent application Serial Number 144,374, filed May 24, 1937, and in a continuation of said application Serial Number 144,963, filed May 26, 1937. Such an alkali cellulose is prepared suitably by immersing an aggregate of cellulosic fibers in a bath of 60 to 80 percent, preferably 75 to 78.5 per cent, aqueous alkali solution maintained at a temperature above the freezing point of said solution, i. e. from about 55° to about 144° C., preferably from about 90° to about 120° C., until the aggregate is completely impregnated with liquid alkali. This impregnation ordinarily requires a relatively short time after which the alkali cellulose is removed from the bath and allowed to swell to its maximum dimension. When the conditions specified in the aforesaid co-pending applications have been met, no liquid alkali will be squeezed from the cellulosic aggregate if the latter is subjected to moderate compression after the swelling step. The swelled alkali cellulose is finally subjected to shredding. The method whereby the alkali cellulose is prepared does not come within the purview of the present invention, and is not claimed herein.

In a preferred method of carrying out our invention, an alkali cellulose which has been prepared at a temperature above its hardening point and particularly one prepared by the method outlined above, is put into a shedder provided with a jacket through which cooling water can be circulated. The alkali cellulosic aggregate is shredded as rapidly as possible to a fine state of subdivision and is simultaneously cooled until it begins to set up or harden, at which point alkali dust becomes noticeable in the atmosphere above the mass being shredded. The finely divided alkali cellulose is then removed from the shredder, placed in a suitable container, and stored in a room where the temperature is controlled at a point in the range from slightly below the hardening point of said alkali cellulose to about 100° C. In most cases the lower temperature limit for satisfactory aging is about 5 centigrade degrees below the hardening point of the alkali cellulose. The alkali cellulose is left exposed to such temperature conditions until the desired degree of viscosity change is obtained. We have found that at temperatures lower than the hardening point of the alkali cellulose, the viscosity thereof is reduced very slowly. At temperatures above said hardening point, up to about 100° C., viscosity reduction becomes progressively more rapid, producing an aged alkali cellulose capable of being etherified to form cellulose ethers of low viscosity having superior physical characteristics.

The following tables give several examples of the results obtained from the aging treatment of alkali cellulose according to the invention. The alkali cellulose employed in the experimenta runs reported in Table I was prepared by passing a sheet of cellulosic pulp continuously into and through a bath of approximately 77 per cent sodium hydroxide solution at a temperature of 110° C. The impregnated alkali cellulose sheet was allowed to swell to its maximum thickness while being conveyed away from the alkali bath and was shredded for about 15 minutes while cooling to a temperature between the hardening point thereof and 100° C. The shredded alkali cellulose was aged at about the temperature at which it came from the shredder, as indicated in the table. After being aged for the length of time indicated in Table I, the alkali cellulose was reacted with an excess of ethyl chloride at about 115° C., and the ethyl cellulose properties are given in Table II. Viscosity determinations on the alkali cellulose prior to etherification were made by dissolving an alkali-free sample thereof to form a 3 per cent solution in a cuprammonium hydroxide reagent containing 30 grams of copper and 180 to 200 grams of ammonia per liter. After being shredded and prior to aging, the cellulose in the alkali cellulose had a viscosity above about 35 centipoises. The viscosity of the ethyl cellulose resulting from the etherification was determined on a 5 per cent solution thereof in a mixture of 80 parts of toluene and 20 parts of ethanol, by volume, at 20° C.

TABLE I

*Alkali cellulose aging conditions*

| Run No. | Oven temperature °C. | Time Hours | Viscosity Centipoises |
|---|---|---|---|
| 1 | 75–80 | 21 | 9.6 |
| 2 | 75 | 27.5 | 9.8 |
| 3 | 70 | 80 | 7.6 |
| 4 | 70 | 77 | |
| 5 | 70 raised to 85 after 22 hours | 37.5 | 11.4 |
| 6 | 70 | 10 | 14 |

TABLE II

*Ethyl cellulose properties*

| Run No. | Per cent ethoxyl | Viscosity, centipoises | Tensile strength kg./cm² | Per cent elongation |
|---|---|---|---|---|
| 1 | 49.2 | 11.0 | 440 | 7 |
| 2 | 48.6 | 12.0 | 470 | 11 |
| 3 | 48.0 | 11.0 | 460 | 5 |
| 4 | 49.0 | 8.8 | 456 | 7 |
| 5 | 48.6 | 10.5 | 450 | 9 |
| 6 | 48.1 | 24.0 | 590 | 17 |

In the foregoing tables it is noted that alkali cellulose products having viscosities in the range from about 7.5 to about 15 centipoises produced ethyl cellulose samples having viscosities between about 8 and about 24 centipoises. Roughly speaking, an 8 to 10 centipoise viscosity alkali cellulose produces an 8 to 12 centipoise viscosity ethyl cellulose, whereas an 11 to 15 centipoise alkali cellulose yields an ethyl cellulose whereof the viscosity is from about 11 to 24 centipoises.

In Table II the results indicate that the ethyl cellulose obtained had in all cases a high ethoxyl content and formed films having higher tensile strength than might be expected from such low viscosity cellulose ethers. The ethyl cellulose produced from each of the 6 batches of alkali cellulose under consideration had a good solubility in all of the common solvents for such ethers. The ethyl cellulose produced was quite stable, varying from 80 to 100 per cent, even though characterized by low viscosities. The stability of a cellulose ether film is expressed as the per cent of the original viscosity of a standard solution of the particular cellulose ether which is retained by a sample of that ether film after having been heated to 120° C. for a period of 16 hours.

In one series of 12 ethylations carried out on an equal number of samples of low viscosity alkali cellulose produced according to the method herein described, remarkably uniform products were obtained. The average viscosity of the ethyl cellulose was 9.9 centipoises, the maximum value being about 11.5 centipoises. The average tensile strength was 425 kilograms per square centimeter of original cross section, the minimum value being about 400. The elongation values varied from about 5 to 12 per cent, the average being 8.1 per cent.

We have illustrated our invention with respect to the aging of alkali cellulose prepared at temperatures above the hardening point of such product, but we have found it to be equally applicable to alkali cellulose prepared below its hardening point. For example, when an alkali cellulose is prepared by shredding together cellulose, water, and sodium hydroxide at or near room temperature, the alkali cellulose may be aged advantageously at a temperature above its hardening point but below about 100° C. Prior to aging, such an alkali cellulose is ordinarily non-uniform, as it is almost impossible to impregnate cellulose fibers uniformly by such processes. That is, when cellulose, water, and solid sodium hydroxide are employed, the alkaline solution formed increases rapidly in concentration as the batch is mixed in the shredder, and when the concentration of the alkali solution becomes greater than about 50 per cent during shredding at room temperature, it begins to solidify, preventing further amounts of alkali from penetrating the fibers. If, however, such a product is aged at or near the hardening point thereof, the alkali concentration becomes uniform throughout the fibers, and when depolymerization of the cellulose occurs, a uniform alkali cellulose of low viscosity results.

The process may also be applied to the aging of an alkali cellulose prepared by grinding together flake sodium hydroxide and an alkali cellulose which has been prepared at a temperature above its hardening point. For example, we may immerse a cellulosic aggregate in a bath of 60–65 per cent sodium hydroxide, shred the resulting alkali cellulose at a temperature above its hardening point while adding sufficient solid sodium hydroxide, preferably in flaked form, to make the amount of alkali and water present correspond in proportion to a 75–80 per cent sodium hydroxide solution. Aging such an alkali cellulose at a temperature within about 5° to 10° of the hardening point of an alkali cellulose having the same alkali content but prepared by immersing a cellulosic substance in 80 per cent sodium hydroxide solution, results in a uniform product of low viscosity.

Since it is difficult to transfer heat through such a fibrous mass, the temperature of an alkali cellulose is adjusted to the desired aging temperature during the shredding operation by heating or cooling as required. Shredding is ordinarily not continued for more than 15 to 30 minutes as we have found this sufficient to yield a substantially finely divided, uniform product. While some change in viscosity occurs during the shredding operation, this is ordinarily not sufficient to form an alkali cellulose which will yield a cellulose ether of low enough viscosity to be most valuable in the preparation of coating compositions and similar products. It is therefore essential to the satisfactory production of low viscosity cellulose ethers that the alkali cellulose from which such ethers are to be prepared be aged under conditions such as those herein described.

The temperature at which an alkali cellulose is aged can be maintained in various ways. For example, the warm, shredded alkali cellulose may be allowed to stand in a container placed in an oven maintained at the temperature desired, or it may be kept at the desired temperature by "tumbling" the same in drums in a heated chamber. Aging may be carried on continuously, if desired, suitably by conveying the warm alkali cellulose, after it has emerged from the shredder, through a rotary kiln at such a rate that the required viscosity drop occurs during the passage of the alkali cellulose therethrough. We prefer those methods of maintaining the temperature which involve rotation or tumbling of the shredded alkali cellulose, as such methods minimize local over-heating, thus preventing local oxidation which would result in the formation of objectionable by-products. We also prefer to carry out the aging operation in an atmosphere substantially free from carbon dioxide and water vapor.

During the aging step the length of time required to reduce the viscosity of an alkali cellulose to any given value depends to a great extent upon the temperature at which the alkali cellulose is aged. The higher the aging temperature, the shorter is the time required to accomplish a given decrease in cellulose viscosity. Since alkali celluloses prepared from high concentration sodium hydroxide solutions have higher hardening points than those produced from more dilute solutions, these materials require to be aged at more elevated temperatures and hence viscosity reduction to any given value in such alkali cellulose is accomplished in a shorter time.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The process which comprises aging an alkali cellulose, wherein the concentration of sodium hydroxide and of water corresponds to a sodium hydroxide solution of 60 to 80 per cent concentration, at a temperature in the range from slightly below the hardening point thereof to the point at which injurious degradation occurs, i. e., to about about 130° C.

2. The process which comprises aging an alkali cellulose wherein the concentration of sodium hydroxide and of water corresponds to a sodium hydroxide solution of 60 to 80 per cent concentration, at a temperature in the range from slightly below the hardening point thereof to about 100° C.

3. The process which comprises shredding a warm alkali cellulose prepared by dipping a cellulosic aggregate in liquid sodium hydroxide of from 60 to 80 per cent concentration, while cooling the alkali cellulose to approximately the hardening point thereof and then aging the alkali cellulose at a temperature in the range from slightly below said hardening point to about 100° C.

4. The process which comprises shredding cellulose, solid sodium hydroxide, and an aqueous sodium hydroxide solution, the sodium hydroxide and water present corresponding in proportion to a 60 to 80 per cent sodium hydroxide solution, while heating the mixture to approximately the hardening point of the corresponding alkali cellulose and aging the alkali cellulose produced at a temperature in the range from slightly below the hardening point thereof to about 100° C.

5. The process which comprises subjecting an alkali cellulose, wherein the concentration of sodium hydroxide and of water corresponds to a sodium hydroxide solution of 60 to 80 per cent concentration, to a temperature in the range from slightly below the hardening point thereof to about 100° C. while tumbling the alkali cellulose in an atmosphere substantially free from carbon dioxide and water vapor until the viscosity of the cellulose therein has been reduced below about 15 centipoises as determined in a 3 per cent solution thereof in a cuprammonium hydroxide reagent containing 30 grams of copper and 180 to 200 grams of ammonia per liter

FLOYD C. PETERSON.
ALBERT T. MAASBERG.